United States Patent [19]

Nickel et al.

[11] Patent Number: 5,703,226
[45] Date of Patent: Dec. 30, 1997

[54] METHOD FOR ACYLATION OF STARCH

[75] Inventors: Gary B. Nickel, Winnipeg; Bernhard Berger, Poplar Point, both of Canada

[73] Assignee: Parrish & Heimbecker, Limited, Winnipeg, Canada

[21] Appl. No.: 437,212

[22] Filed: May 8, 1995

Related U.S. Application Data

[63] Continuation of Ser. No. 155,124, Nov. 19, 1993.
[51] Int. Cl.$^6$ .................... C08B 31/02; C08B 31/04
[52] U.S. Cl. .................... 536/107; 536/110; 536/124; 536/127
[58] Field of Search .................... 536/110, 124, 536/127, 107

[56] References Cited

U.S. PATENT DOCUMENTS

| | | | |
|---|---|---|---|
| 2,461,139 | 2/1949 | Caldwell | 536/110 |
| 2,589,226 | 3/1952 | Carson | 536/110 |
| 2,627,516 | 2/1953 | Lohmar, Jr. | 536/110 |
| 3,061,604 | 10/1962 | Kerr et al. | 536/108 |
| 3,130,081 | 4/1964 | Evans | 536/110 |
| 3,184,335 | 5/1965 | Germino et al. | 536/110 |
| 3,188,237 | 6/1965 | Mosh et al. | 536/102 |
| 3,281,411 | 10/1966 | Lemmerling | 536/110 |
| 3,376,286 | 4/1968 | Germino et al. | 536/110 |
| 3,525,672 | 8/1970 | Wurzburg et al. | 536/106 |
| 3,549,619 | 12/1970 | Mark et al. | 536/110 |
| 3,553,196 | 1/1971 | Mark e tal. | 536/110 |
| 3,557,091 | 1/1971 | Martin et al. | 536/110 |
| 3,839,320 | 10/1974 | Bauer | 536/110 |
| 4,011,392 | 3/1977 | Rudolph et al. | 536/108 |
| 4,048,435 | 9/1977 | Rutenberg et al. | 536/110 |
| 4,192,783 | 3/1980 | Bomball et al. | 524/21 |
| 4,238,604 | 12/1980 | Katcher et al. | 536/110 |
| 4,321,360 | 3/1982 | Blount | 536/101 |
| 4,501,888 | 2/1985 | Schmidt | 536/110 |
| 4,579,944 | 4/1986 | Harvey et al. | 536/102 |
| 4,585,560 | 4/1986 | Sikes et al. | 210/698 |
| 5,120,562 | 6/1992 | Furcsik et al. | 536/110 |
| 5,164,215 | 11/1992 | Furcsik et al. | 536/110 |
| 5,314,754 | 5/1994 | Knight | 425/532 |

OTHER PUBLICATIONS

Whistler et al., "Mechanical Properties of Films From Amylose, Amylopectin and Whole Starch Triacetates", Ind. Eng. Chem., 36, 796–988 (1944).

Ott, "Cellulose and Cellulose Derivatives" in *High Polymers* v. 5 (1943) pp. 758–775 (Month Unavailable).

*Primary Examiner*—Jeffrey C. Mullis
*Attorney, Agent, or Firm*—Dorsey & Whitney

[57] ABSTRACT

A process for the uniform acylation of starch comprising preconditioning the starch with a base for at least six hours, adjusting the pH to a suitable range for acylation, adding the desired acylation agent and isolating the acylated starch. A continuous method for acylating starch is also described.

8 Claims, No Drawings

METHOD FOR ACYLATION OF STARCH

This is a continuation of application Ser. No. 08/155,124 filed Nov. 19, 1993.

TECHNICAL FIELD OF THE INVENTION

The present invention relates to a method of acylating starch and specifically to acylating amylose in unrefined products such as pea starch.

BACKGROUND OF THE INVENTION

Starch is obtained commercially from vegetables such as corn, potatoes and peas. It is a white odorless, tasteless granular or powdery complex carbohydrate $(C_6H_{10}O_5)_x$ that is the chief storage form of carbohydrate in plants. It is hydrolyzed by acids to dextrins, hydrol, and finally glucose and by carbohydrases to dextrins or glucose. It is insoluble in cold water but swells in hot water and cools to form a paste or gel. It is modifiable to substituted starches that provide unique or enhanced properties over that obtainable from starch per se.

There is a considerable body of art directed to the modification of starch in order to produce foodstuffs, adhesives, paper and textiles, laundering materials, pharmaceuticals, and the like. One manner of treatment of starch is by acylation. Acylation modifies the properties of the starch and makes it more easily converted into a form either more suitably processed or which possesses modified properties making a unique starch-based product.

Acylation of starch is well known in the art. U.S. Pat. No. 4,501,888 to Schmidt is typical of prior art processes whereby the starch is dispersed in an organic acid and contacted with an acid anhydride. Subsequently, the components are reacted in the presence of a quaternary ammonium halide. This process is not effective on unrefined starch-containing substances. In addition, substitution of the acyl groups may not be uniform throughout the starch molecule. U.S. Pat. No. 3,130,081 to Evans discloses a method for preparing amylose dispersions and their acetylation. The method includes dispersing amylose in an alkali such as sodium hydroxide at a pH of approximately 10. The pH is subsequently lowered using acetic acid. Acetic anhydride is added to effect acetylation. This process is only effective against preisolated amylose. In addition, the process does not contemplate the use of an extended presoak.

U.S. Pat. No. 4,085,435 to Rutenberg et al. discloses a method of preparing highly substituted granular starches via a cross-linking reaction. The starch is reacted with a cross-linking agent, such as acetylaldehyde, followed by an esterification agent, such as acetic anhydride. While this process is effective, it is commercially expensive because of the need to cross-link the starch before acylating the same. Due to this reaction and it by-products, expensive isolation procedures must be employed to obtain the desired acylated product. In addition, use of cross-linking agents, such as acetylaldehyde, precludes use of the final product in food preparations.

There is a need in the art for an effective and inexpensive process for chemically modifying unrefined starch products to produce a starch that is amenable to food processing that materially alters physical and/or chemical properties of the starch. As noted above, others have attempted, with varying degrees of success, to modify starch products by acylation, in particular, by acetylation. A number of problems are associated with the prior art processes. They are typically inefficient and ineffective at achieving a degree of acylation that is desired to make the total starch molecule available to subsequent processing. In many instances, the acylation is coupled with cross-linking that actually makes the starch molecule less amenable to subsequent modification because potentially modifying materials cannot penetrate the cross-linked starch molecule to effect the desired modification.

It would be desirable to effect acylation of starch such that the granule is uniformly penetrated by the acylation agents. If this uniform penetration does not occur, the starch will be acylated mostly on the surface of the granule and will not have the desired functionality throughout the granule. The uniform penetration facilitates the formation of an acylated product that is amenable to many subsequent modifications.

In addition, it is desirable to have a uniform degree of substitution ("D.S.") of the acyl moieties per gluconomere unit in the starch backbone. The more acyl substitution, the higher is the D.S. A D.S. of 0.10 indicates that every 10th repeating gluconomere unit has been acylated. For purposes of the present invention, a D.S. of about 0.05 to 0.10 achieves a desirable degree of modification that allows subsequent reaction to achieve unique starch-modified structures capable of use within food products. For example, the acylated starch product may be processed into stable clathrates for use as fat delivery systems. As such, it is important to have the functional acyl groups evenly dispersed at a desired interval on the starch molecule to ensure proper interaction with the fat.

In addition, starch acylated according to the present invention resists retrogradation. Starch that is not sufficiently modified will tend to retrograde and recoil into its intra-hydrogen bridge bonded form after acylation causing an effect termed "weeping" whereby water seeps from the starch product. This retrogradation hampers subsequent modification and/or use in food products, particularly in products where shelf life is important.

The desired degree of substitution would not be a meaningful advantage if the process did not provide a reasonable yield, such as a yield of at least about 40–60% based on the acylating agent. Because government regulations may dictate the amount of chemical used on or contained within a food product, it is important to have a process that is efficient and results in relatively high yields. It would also be desirable to be able to effect such high degree of substitution using only food grade solvents, thereby eliminating the need to remove traces of non-food grade solvent which is always a difficulty with some prior art processes.

The foregoing advantages are achieved by the practice of this invention.

SUMMARY OF THE INVENTION

This invention relates to a process for uniformly acylating unrefined starch regardless of the starch source. In particular, the invention relates to acylating starch to produce uniformly and highly substituted acylated amylose. The invention effectively acylates starch with only food grade reagents to produce an acylated starch that can be recovered by simple washing followed by centrifugation.

The acylation process of the invention involves soaking the starch in a soluble base to a pH greater than about 8, until the starch is ready for a pH adjustment to about 8 or lower. The base conditioned starch is then subjected to acylation by reaction with an acyl anhydride. As a result of the base conditioning of the starch, acylation is uniform throughout the starch molecule and the D.S. of the acyl groups on the starch molecule is from about 0.05 to 0.10 The resulting acylated starch is suitable for use in making food products.

The invention finds particular application to the acylation of starches that are difficult to acylate. Pea starch possesses a difficult substrate to acylate because most hydroxyl groups are locked by hydrogen bridge bonds and therefore are less accessible. This starch requires a high gelation energy and this makes it resistent to chemical modification, particularly to carboxylic acid treatment. The base digestion step of the process of this invention overcomes the problem of penetrating the substrate of pea starch and makes the overall acylation exceptionally facile.

DETAILED OF THE INVENTION

To begin the process, a starch-containing substrate is provided. The substrate is soaked in a soluble base at a pH between 8 and 12 to allow ions from the base to penetrate the substrate. As a result of the soaking, the substrate is swelled. After a suitable amount of time, the pH is adjusted to between 7 and 8 with a suitable acid. Subsequently, an acylating agent such as an acetyl compound is added to effect acylation. The product thus acylated is washed with water, centrifuged and/or dried. The resulting acylated product has a uniform D.S. of about 0.05 to 0.10, indicating that about every tenth repeating unit is acylated. In addition, this product is immediately suitable for use in food products.

Both amylose and the long chain ends of amylopectin are starch components that are effectively acylated by this process. Of particular commercial importance is amylose. Most any granular amylose or amylopectin containing product may be provided as a substrate for the present process. The substrate should have a relatively high amylose content. A content of at least 10% by weight is preferred, typical of most legumes. Examples of suitable starting materials are corn, potatoes, wheat, waxy maize, peas, such as field peas, lentils and beans, such as mung beans.

The starch may be granular in form. Native starting materials such as pea flour are acceptable. It is desirable to filter or agitate these materials to remove chaff and proteinaceous materials in order to obtain granular starch.

The starting material is soaked in a penetrating base, i.e. a base that penetrates the exterior surface of the starch and makes the starch less dense. Suitable bases are the Brønsted-Lowry bases, or proton acceptors. Member of this group include the alkali metals, alkaline earth metals and quaternary oniums. Suitable alkali metal bases include the alkali metal hydroxides such as sodium and potassium hydroxide. Suitable alkaline earth metal bases include calcium carbonate. Suitable quaternary oniums include quaternary ammonium, sulphonium and phosphonium compounds. Sodium hydroxide is preferred due to the relatively small size of the sodium ion. Sodium ions more readily penetrate the substrate and form sodium acetate. Sodium acetate enhances the acylation reaction.

The D.S. of the acylated starch can be correlated with the length of the soak. The soak must be long enough to allow the base ions to penetrate and migrate throughout the substrate. Suitable penetration occurs in soaks exceeding six hours. Improvement in the degree of substitution, as well as uniformity of substitution, results from longer soak periods. However, periods over 30 hours can deleteriously affect the starch, by causing the substrate to break down.

The temperature of the presoak may vary in the range of 15°–30° C. A temperature in the range of 20°–25° C. is preferred with a temperature of about 23° C. most preferred.

Temperature of the acylation reaction will vary according to the acylating agent employed. Because the reaction is carried out in water, temperature is a significant factor. For example, when using acetic anhydride, an elevated temperature could drive the acylation reaction towards the formation of acetic acid and away from the formation of the acetyl radical, thereby decreasing the efficiency of the acetic anhydride. Accordingly, temperatures in the range of 15°–30° C. are desirable with temperatures in the range of 20°–25° C. most preferred.

A higher degree of substitution and uniformity is also achieved by varying the pH. A pH of between 8 and 11 is desired, with a pH value between 7.5 and 8 being preferred. However, it should be appreciated that by varying the pH in connection with varying the soak time one can obtain higher levels and greater uniformity of acylation.

The soaking prior to acylation swells the starch granules to a condition that allows them to be readily penetrated by the acylating agents(s). Acylation should proceed prior to reversing the swelling which occurs naturally typically within a couple of hours from the start of soaking. This procedure should be contrasted with the prior art thermal treatment of starch granules that permanently gelatinizes the starch. The reversible nature of the starch that is subjected to the soaking procedure demonstrates that the groups therein that are available for reaction with acylating agents are not lost because of the soaking procedure.

After soaking and obtaining a swollen condition, the pH is then adjusted to a suitable pH for the acylating agent to be employed. It is preferred that the pH be adjusted between about 7 and about 8. The pH is maintained with the addition of the suitable base, as needed.

Both organic and inorganic adds may be employed for adjusting the pH. Inorganic adds such as mineral adds are suitable. Suitable mineral adds are hydrochloric add, sulfuric acid, phosphoric acid, nitric acid and the like. Suitable organic acids include the organocarboxylic acids such as acetic acid, propionic acid, butyric acid, methyl sulfonic acid, toluene sulfonic acid, and the like. It is preferred to use an acid that is common to the acylating agent. This use eliminates the need to separate mixed acids in the recovery steps of the process. When acetic anhydride is the acylating agent it is preferred to use acetic acid for pH adjustments.

Acylating agents are well known in the art. Many acylating agents are suitable for use in the present invention, such as acid anhydrides, acid halides and the alkali metal salts of carboxylic acids. Suitable acid anhydrides are acetic anhydride, propionic acid anhydride, and mixed anhydrides of acetic and propionic acids and the like, with acetic anhydride most preferred. Suitable acid halides are acetyl chloride, butyric acid chloride, benzoyl chloride, propionic acid chloride, and stearyl chloride with acetyl chloride most preferred. Suitable alkali metal salts of carboxylic acids are those having between two and eight carbon acids. Alkali metal salts of carboxylic acids having between two and four carbon atoms are highly preferred and acetic acid is most preferred.

Traditionally, acetic anhydride has been disfavored for esterification of starch because of its high cost. In addition, the use of acetic anhydride is regulated in food products such that only relatively small amounts of the chemical may be used. However, the present invention achieves yields superior to the yields obtained over the prior art, more dramatically so with respect to the acetylation of starch in unrefined products. Accordingly, the use of acetic anhydride is commercially feasible, and in fact desirable because of its effectiveness as an acetylation agent in the process of this invention and due to the fact that it can be employed in amounts that will not run afoul of government regulation.

Because the starch is not irreversibly gelled and because cross-linking agents are not employed, isolation of the resulting starch product is greatly simplified. The mixture produced by the acylation reaction is stirred with water and centrifuged using a decanter, nozzles disc or basket centrifuge. The resulting supernatant, containing soluble by-products and sodium acetate, is drawn off. The sodium acetate may be subsequently recovered, if desired. The remaining pellet comprises inert starch cakes.

The starch cakes thus obtained are stirred with water and again centrifuged to remove any remaining by-products. These by-products are drawn-off in the supernatant. The resulting cake may be dried on a flash, spray or drum dryer, or the cakes may be subjected to further processing for use in products such as fat delivery systems. After the isolation and/or drying procedure, the modified starch is immediately ready for use in food products.

The resulting product is acylated to approximately every 10th repeating unit on the amylose. The product resists retrogradation and resulting recoiling. This product is easily modified by subsequent treatments because of its uniformity of acetylation and chemical properties.

The swelling of the starch granule greatly enhances the yields over those of the prior art. Reagent yields can be measured by monitoring the amount of sodium hydroxide used in the reaction during the acylation step, based on the acylating agent. In an ideal reaction, N moles of acetic anhydride forms N moles of acetic acid and N moles of acetyl radical. N moles of acetic acid require N moles of sodium hydroxide to neutralize and convert the acid into sodium acetate. Accordingly, yield can be calculated by the formula 100 (2N−(N+X))% where N+X equals the quantity of sodium hydroxide consumed in excess of N to neutralize the acetic acid liberated during the acetylation. In addition, the degree of substitution can be calculated by the formula:

$$\frac{2N-(N+X)}{\text{\# of gluconomere moles}}$$

Applicants have determined that yields of 65% are readily achieved in accordance with the present invention.

The following examples illustrate the present invention.

EXAMPLE I 100 grams of Accu Gel® native, granular pea starch, commercially available from Woodstone Foods Corporation in Winnipeg, Canada, was slurried in 1 liter of tap water in a beaker and stirred with an overhead stirrer. The pH was adjusted to 10 with sodium hydroxide and the substrate steeped for 10 hours at 20° C. in a covered beaker. After the steeping period, 10% acetic acid was added to adjust the pH to between 7 and 8. 10.8 grams of acetic anhydride was then added to the mixture over a 45 minute period while the pH was maintained with N+X mls of sodium hydroxide such that the pH did not drop below 7. The mixture was desalinated in a basket centrifuge at 2000 Gs for approximately three minutes. The supernatant was decanted. The resulting sediment was reslurried with 1 liter of tap water per 100 grams of starch added. This mixture was centrifuged in a basket centrifuge at 2000 Gs. The resulting sediment was washed with absolute alcohol to remove most of the water. The mixture was centrifuged again and the alcohol supernatant discarded. The resulting sediment cake was spread on tin foil and air dried. The resulting product had a D.S. of 0.108. The reagent efficiency was 63.83%.

The following table sets forth additional data using the same procedure set forth above wherein the presoak time and amount of acetic anhydride was varied.

| Hours PreSoak | Yield | D.S. | Acetic Anhydride required to achieve target D.S. of approximately .10 per 100 grams of starch |
|---|---|---|---|
| 0 | 33.60 | 0.055 | 21.2 grams |
| 6 | 57.21 | 0.097 | 12.0 grams |
| 10 | 63.83 | 0.108 | 10.8 grams |
| 24 | 64.78 | 0.110 | 10.6 grams |

The data clearly demonstrate that the processes outside the invention, whereby little or no presoak is employed, have very low yields and Degrees of Substitution. By virtue of these low yields, the amount of acetic anhydride required to effect acetylation is double that of the present invention and well beyond the acceptable amount allowed under current F.D.A. regulations.

EXAMPLE II

Processes outside the invention wherein the substrate is not preconditioned produce a product that weeps upon storage. This weeping is also exhibited in products that are a blend of acylated and non-acylated starches, where non-acylated starch is blended with acylated starch to achieve a desired D.S. In contrast, the preconditioning process of this invention produces a product that does not appreciably weep, even when the acylated starch has a D.S. that is a factor of 10 less than the product produced in processes outside the invention. Weeping may be viewed as an indication of bonding forces between starch molecules that are precluded by the uniform saponification and acylation of the products of this invention. This means that the starch is uniformly acylated throughout the molecule, as opposed to non-uniform acylation believed to occur in processes outside the invention.

To quantify this weeping effect, the volume of gelation water excluded from starch, over a period of time, was measured. The presence of excluded gelation or bleed water is an indication that the starch is reverting to its original intra-hydrogen bonded form, thereby excluding a portion of the gelation water.

To measure the bleed water excluded, 4 grams of the starch product obtained in Example I with a zero hour pre-soak was placed in a beaker in 46 grams of water and heated to 90° C. Similarly, 4 grams of the starch product obtained in Example I with a ten hour pre-soak was placed in a beaker in 46 grams of water and heated to 90 ° C. After heating to 90° C., the mixtures were cooled to room temperature. The resulting gel slugs were quartered. Each quarter was placed on top of a layer of glass beads within a beaker. The beakers were covered and stored in an ice bath at 0° C. for 20 hours. After 20 hours, the bleed water was quantitatively withdrawn and weighed. The water recovered was expressed as a percentage of the total water present.

The product obtained from the process whereby the starch was not pre-soaked excluded 1.8 grams of bleed water which was 3.9% of the total water present. The product obtained from the process whereby the starch was soaked for 10 hours excluded 0.8 grams of bleed water which was 1.7% of the total water. Expressed as a ratio, the present invention yields a starch which excludes a factor of 2.3 less water than the process which does not employ an extended presoak.

EXAMPLE III 100 grams of Accu Gel® native, granular pea starch, commercially available from Woodstone Foods Corporation in Winnipeg, Canada, was slurried in 1 liter of tap water in a beaker and stirred with an overhead stirrer. The pH was adjusted to 10 with sodium hydroxide and the substrate steeped for 10 hours at 20° C. in a covered beaker. After the steeping period, 10% acetic acid was added to adjust the pH to between 7 and 8. 7.7 grams of acetyl chloride was then added to the mixture over a 45 minute period while the pH was maintained with N+X mls of sodium hydroxide such that the pH did not drop below 7. The mixture was desalinated in a basket centrifuge at 2000 Gs for approximately three minutes. The supernatant was decanted. The resulting sediment was reslurried with 1 liter of tap water per 100 grams of starch added. This mixture was centrifuged in a basket centrifuge at 2000 Gs. The resulting sediment was washed with absolute alcohol to remove most of the water. The mixture was centrifuged again and the alcohol supernatant discarded. The resulting sediment cake was spread on tin foil and air dried. The process resulting a product having a D.S. comparable to that obtained in Example I. In addition, the reagent efficiencies were comparable. The reaction may be easily carried out with other acid chlorides, such as benzoyl chloride. The only modification that need be made is an adjustment to ensure the stoichiometrically proper amount of acylating agent is added.

No special equipment is needed to perform the process of the invention. Including soak time, the process may be carried out continuously. For example, a desired amount of starch is added to a 500 gallon steeping tank containing sodium hydroxide and water. The mixture is steeped for a period of time ranging from 6–24 hours at a pH ranging from a value of 8 to 11 in order to swell the granule and allow sufficient penetration of sodium ions. The temperature may range from 15°–30° C.

From the container of swelled starch, the mixture is run through a mix reactor wherein acid is added to bring the pH to the desired range for acylating and the desired acetylating agent is added. The contents of the holding tank are drawn off within an hour to allow for acylation while the starch granule is swelled. The same principles exist when carrying out the process in a continuous manner. The flow rate through the mix reactor is adjusted to ensure the mixture flows through within the required time parameters.

The pH of the acylation reaction will vary with the acylating agent employed. Sodium hydroxide or other suitable base is used to maintain the pH at the desired value. The temperature during this reaction may also vary as in the first step. Running the reaction at room temperature is desired to eliminate the need for heating equipment.

After addition to the mix reactor, the mixture is run through a suitable centrifuge such as a decanter, nozzles disc or basket centrifuge. The supernatant, containing soluble by-products, is drawn off. The resulting sediment containing the modified starch is stirred with water and centrifuged a second time. The resulting sediment may be dried or immediately subject to further modification and processing. Drying may occur on a flash, spray or drum-type dryer. The sodium acetate that is removed as by-product may be recycled to form acetic anhydride, as well as sodium hydroxide.

The process may further be adapted to suit particular commercial needs. For example, more mix reactors may be provided to reduce residence times within the tanks. Additional steeping tanks may be provided such that when one tank is reacting in the mix reactor, other tanks are carrying out the steeping process thereby enhancing continuous, on-line capabilities of the process.

The process of the present invention can be easily adapted for use in products outside the food industry. The preconditioning step facilitates modifications resulting in degrees of substitution exceeding 10, which are impractical for food use but have applications in adhesives, papers, textiles, laundering materials, pharmaceuticals, and the like.

In addition, the process may be used to effect modifications aside from acylation. For example, the process may be carried out using dimethylsulfate instead of an acylation reagent. The resulting product is uniformly methoxylated and suitable for use in many applications, including food preparation.

As will be recognized by those skilled in the art, variations may be made in ingredients, proportions and procedures as long as such variations are within the scope and spirit of the following claims.

We claim:

1. A process for uniformly acylating starch without gelatinization of the starch, comprising:
   a) providing a granular non-gelatinized starch-containing substrate selected from the group consisting of mung bean flour, lentil bean flour and pea flour
   b) soaking said substrate in a penetrating base at a pH of between 8 and 10 for a sufficient amount of time to swell the substrate
   c) heating the substrate and base during soaking to between 15° C.
   d) reducing the pH to between about 7 and about 8;
   e) adding an acylating, agent selected from the group consisting of acid anhydrides, acid halides and alkali metal salts of carboxylic acids to the swelled substrate; and
   f) isolating the resulting acylated product by washing and centrifuging the acylated product.

2. The process of claim 1 wherein the substrate is mung bean flour.

3. The process of claim 1 wherein the substrate is lentil bean flour.

4. A process for uniformly acylating starch without gelatinization of the starch, comprising:
   a) providing a non-gelatinized starch-containing substrate:
   b) soaking said substrate in a penetrating base at a pH of between 8 and 10 for a sufficient amount of time to swell the substrate:
   c) heating the substrate and base during soaking to between 15° C. and 30° C.;
   d) reducing the pH to between about 7 and about 8 by adding acetic acid;.
   e) adding an acylating agent selected from the group consisting of acid anhydrides, acid halides and alkali metal salts of carboxylic acids to the swelled substrate: and
   f) isolating the resulting acylated product by washing and centrifuging the acylated product.

5. A process for uniformly acetylating amylose to a degree of substitution of between 0.05 and 1.0 without gelatinization of the amylose, comprising:
   a) soaking an amylose-containing, non-gelatinized substrate selected from the group consisting of mung bean flour, lentil bean flour and pea flour having an amylose content of at least 10% in sodium hydroxide at a pH of between 8 and not over 11 for a period of time sufficient to allow the sodium ions to penetrate and migrate throughout the starch-containing substrate;
   b) decreasing fire pH to between about 7 and about 8;
   c) adding a carboxylic acid anhydride acetylating agent to effect acetylation; and
   d) isolating the resulting acetylated starch by washing and centrifuging the acetylated product.

6. The process of claim 5 wherein the substrate is lentil bean flour.

7. The process of claim 5 wherein the substrate is mung bean flour.

8. A process for uniformly acetylating amylose to a degree of substitution of between 0.05 and 1.0 without gelatinization of the amylose, comprising:
   a) soaking an amylose-containing, non-gelatinize substrate in sodium hydroxide at a pH of between 8 and not over 11 for a period of time sufficient to allow the sodium ions to penetrate and migrate throughout the starch-containing substrate;
   b) decreasing the pH to between about 7 and about 8 by the addition of acetic acid;
   c) adding a carboxylic acid anhydride acetylating agent to effect acetylation; and
   d) isolating the resulting acetylated starch washing and centrifuging the acetylated product.

* * * * *